United States Patent [19]

Grigel et al.

[11] Patent Number: 4,905,614

[45] Date of Patent: Mar. 6, 1990

[54] METHOD FOR THERMIC DISPOSAL OF WASTE MATERIALS

[75] Inventors: Wolfgang Grigel, Lohmar; Jakob Hinterkeuser, Sankt Augustin; Heinz-Dieter Waldhecker; John Rizzon, both of Rösrath; Kariheinz Passler, Cologne, all of Fed. Rep. of Germany

[73] Assignee: Klöckner-Humboldt-Deutz Aktiengesellschaft, Fed. Rep. of Germany

[21] Appl. No.: 238,522

[22] Filed: Aug. 31, 1988

[30] Foreign Application Priority Data

Sep. 2, 1987 [DE] Fed. Rep. of Germany ....... 3729210

[51] Int. Cl.$^4$ .............................................. F23G 7/04
[52] U.S. Cl. ....................................... 110/346; 55/72; 55/80; 55/268; 110/216; 110/238
[58] Field of Search ....................... 110/346, 216, 238; 55/80, 72, 69, 268

[56] References Cited

U.S. PATENT DOCUMENTS

| 4,213,407 | 7/1980 | Headley .............................. 110/346 |
| 4,573,418 | 3/1986 | Marzendorfer et al. ....... 110/346 X |
| 4,620,492 | 11/1986 | Vogg et al. ....................... 52/72 X |

*Primary Examiner*—Edward G. Favors
*Attorney, Agent, or Firm*—Hill, Van Santen, Steadman & Simpson

[57] ABSTRACT

Waste materials, potentially following their comminution and potentially following their dying or, respectively, preheating, are burned in a cyclone kiln (buring cyclone or, melting cyclone) at extremely high temperatures above 1500° C. with formation of a molten slag low in noxious substances and a hot exhaust gas in which latter the valuable substances and/or noxious substances contained in the waste materials volatilize, whereby dusts enriched with valuable substances on the one hand and, on the other hand, dusts enriched with noxious substances are respectively separately separated out of the exhaust gas by partial condensation.

17 Claims, 1 Drawing Sheet

METHOD FOR THERMIC DISPOSAL OF WASTE MATERIALS

BACKGROUND OF THE INVENTION

This invention relates to an improved method and apparatus for thermal disposal of waste material such as sewage, sludge, garbage or the like, involving drying and burning of the waste.

The economical and environmentally safe elimination of waste materials such as sewage sludge, special garbage or the like raises considerable difficulties. This is particularly true when such waste materials are burned in standard garbage incinerating systems which have grate firings. Grate firings must be operated with high excess air ratios, so that great quantities of flue gas having relatively low temperature arise. Great quantities of flue gas correspondingly require large and cost-intensive exhaust gas scrubbing systems. Further, it is possible in grate firings that the combustion temperatures at least temporarily fall below 1000° C. At such temperatures, some dangerous toxins such as dioxins, do not yet decompose. Many valuable substances and/or noxious substances contained in the waste materials do not volatilize at such temperatures, so that such substances undesirably pass into the ash. Conventional garbage incinerating systems are uneconomical and environmental pollution can derive because of the emission of organic compounds and because of the ashes thereby arising are not leachingresistant.

An object of the present invention is to create a method with which waste materials such as, for example, sewage sludge, special garbage or the like, can be thermally disposed in an environmentally safe and also an economic fashion.

A further object of the invention is to provide a method and apparatus for the improved continuous treatment of waste materials which permit recovery of useful substances out of exhaust gases.

A still further object of the invention is to provide an improved method and apparatus for the treatment of waste materials which complies with high requirements of laws which pertain to maintaining discharge gases at a non-noxious level.

A still further object of the invention is to provide an improved method and apparatus for the treatment of waste materials such as garbage and sewage wherein materials are handled in a special sequence of steps at unique temperatures and in a unique separation and mixing so that an improved handling results which reduces costs and results in an environmental improvement over methods heretofore used.

FEATURES OF THE INVENTION

In the method of the invention, dried waste materials are characteristically burned in a cyclone at high temperatures with formation of a molten slag low in noxious materials and formation of a hot exhaust gas which contains valuable substances and/or noxious substances volatilized out of the waste materials. The valuable substances are separated out of the exhaust gas following a first exhaust gas cooling on the basis of partial condensation and essentially the noxious substances are separated out following at least one further exhaust gas cooling to lower temperature, being separated out by partial condensation. The combustion temperature in the cyclone always lies above 1500° C., preferably at about 1600° C., whereby all organic compounds that are environmentally unsafe are destroyed. According to a further feature of the invention, one part of the cyclone exhaust gases are used for drying the waste materials after being cooled in the exhaust gas cooling units, for example for drying the sewage sludge, before these waste materials are introduced into the cyclone for burning. The vaporous, noxious smelling drier exhaust gases are advantageously mixed with the hot cyclone exhaust gases for deodorization thereof, whereby a temperature of at least 800° C must be reached.

The valuable substances separated out of the cyclone exhaust gas following the first cooling unit can, for example, be composed of Ag, Zn, Pb, etc., whereas the non-metallic noxious substances in the exhaust gas that contain chlorine, sulfur, fluorine, etc. are still vaporous. The noxious substances are then separated out of the exhaust gas following the second cooling unit.

Other features, advantages and other objects will become apparent to those versed in the art with the teaching of the principles of the invention in connection with the disclosure of the preferred embodiment in the specification, claims and drawings, in which:

DESCRIPTION OF THE DRAWINGS

The single Figure of the drawings, labelled

DESCRIPTION OF THE PREFERRED EMBODIMENT

Figure 1:
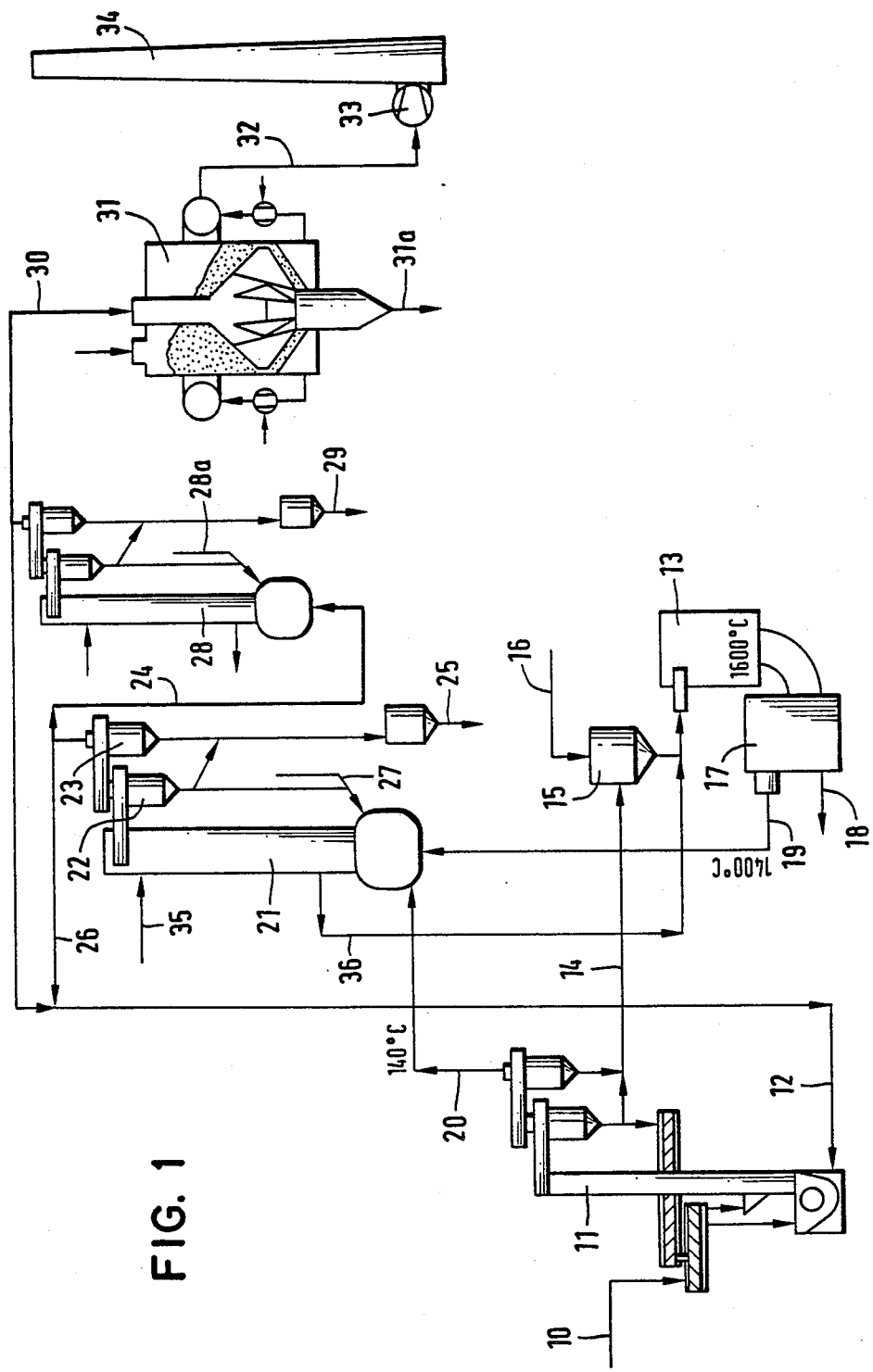
FIG. 1 is a diagrammatic illustration of apparatus constructed and operating in accordance with the principles of the invention

According to the exemplary embodiment of the drawing, sewage sludge 10 that is mechanically de-watered to a dry substance of 25% through 50% is dried in a flow drier 11 that potentially comprises a preceding pre-comminution means. One part of the exhaust gases of a cyclone 13, in which the sewage sludge 14 dried to more than 95% dry substance is burned, serves as drying gas 12 having a temperature of about 500° C. 15 references an intermediate hopper via which other waste materials 16 such as old oil, etc., can be simultaneously delivered to the cyclone under given conditions. A hot cyclone exhaust gas as well as a molten slag emerge from the cyclone 13 in which, for example, a temperature of 1600° C. prevails. The gas and slag pass into a furnace 17 that serves for separation into a slag 18 low in noxious substances that can be disposed of or, respectively, re-utilized after solidification and that exhibits a high density and is further separated into a hot exhaust gas 19 of roughly 1400° C. that contains the valuable substances and noxious substances volatilized out of the waste materials.

Vaporous exhaust gases 20 of the drier that have a temperature of about 140° C. are mixed with the hot cyclone exhaust gases 19 for destroying the aromatic substances. In a first cooling unit 21 that is preferably fashioned as a circulating fluidized bed and in following cyclones 22, 23, valuable substance dusts 25 that, for example, contain Ag, Zn, Pb etc., and that are partially condensed out of hot exhaust gas 24 via the cyclone 23 are enriched and withdrawn, whereas a sub-stream of the exhaust gas 24 is recirculated into the flow drier 11 via a conduit 26. For starting the system, added dust is introduced into the cooling unit 21 via a conduit 27.

After the cyclone exhaust gas 24 has been freed of valuable substances, it is cooled to about 300° C. in a second cooling unit 28 comprising circulating fluidized bed that is preferably fashioned similar to the first cooling unit 21, whereby dusts 29 high in noxious substances are separated out of the exhaust gas, these dusts containing chlorine, sulfur, fluorine, etc. Reagents 28a, for example calcium hydroxide, are introduced into the second cooling unit 28 for the separation of these constituents. The largely cooled exhaust gas 30 following the second cooling unit 28 is then also conducted through a bulk fill filter 31 for superfine dedusting and superfine gas scrubbing for the separation of residual dusts 31a and such substances that are not condensed or not completely condensed in the two cooling units 21 and 28. Cleaned exhaust gas 32 satisfying clean air statutory requirements is withdrawn via the induced draft ventilator 33 and the chimney 34. For reducing a possible $NO_x$ content of the exhaust gas, the latter can have $NH_3$ added thereto.

For heat elimination out of the first cooling unit 21, an airstream 35 is conducted therethrough, this taking heat from the cooling unit 21 by indirect heat transfer and an airstream 36 that has been pre-heated in this fashion is introduced into the cyclone 13 as oxygen carrier.

Advantages of the method of the invention are essentially as follows. As a result of the high reaction temperature, all environmentally polluting, organic noxious substances are destroyed; the mineral constituents are acquired in utilizable form as leaching-resistant, dense slags; the metalliferous valuable substances (zinc, lead, silver, etc.) are acquired enriched in a dust; the non-metalliferous noxious substances ($SO_2$, CL, F) are separated out; the clean air laws are satisfied; no waste water arises in the process; a compact firing system is achieved because of the high loading of the firing chamber (at least 2.5 $GJ/m^3$ in the cyclone compared to 0.5 $GJ/m^3$ in a rotary tubular kiln) and lower specific quantity of exhaust gas ($\lambda = 1.1$ in the cyclone compared to $\lambda = 2$ in the rotary tubular kiln); combustion in the cyclone can occur energetically self-sufficient; comparatively low operating and capital costs; for reducing the formation of $NO_x$, the employment of oxygen instead of combustion air is possible and advantageous.

The following may be cited as examples of waste materials to be disposed of in accord with the method of the invention.

Municipal and industrial sewage sludge, mechanically dewatered; all types of special garbage insofar as, dependent on pretreatment, they can be metered in liquid or fine-grained form (for example, PCB, old oil, oil, lacquer residues, etc., containing waste materials); flue-dust from thermic disposal processes that had to be hitherto embedded in special waste disposal sites; and gaseous substances that contain condensable components such as, for example, vapors having toxic, injurious substances.

We claim as our invention:

1. A method for thermic disposal of waste materials such as sewage sludge, special garbage or the like, comprising the steps: drying and burning of the waste materials, characterized in that dried waste materials are burned in a cyclone at high temperatures above 1500° C. with formation of a molten slag low in noxious substances and of a hot exhaust gas that contains valuable substances and/or noxious substances volatilized out of the waste material; and separating valuable substances from the exhaust gas by partial condensation following a first exhaust gas cooling and separating the noxious substances out at lower temperatures by partial condensation following a second further exhaust gas cooling.

2. A method of thermic disposal of waste materials such as sewage sludge, special garbage or the like, according to the steps of claim 1, characterized in using one part of the exhaust gases of the burning cyclone for drying and for preheating the waste materials before the materials are introduced into the cyclone, said part being used after first being cooled.

3. A method of thermic disposal of waste materials such as sewage sludge, special garbage or the like, according to the steps of claim 2, characterized in that vaporous exhaust gases from the drying step are mixed with the hot cyclone exhaust gases for the destruction of aromatic substances.

4. A method of thermic disposal of waste materials such as sewage sludge, special garbage of the like, according to the steps of claim 1, characterized in that valuable substances are separated out of the cyclone exhaust gas in the first cooling step including Ag, Zn, Pb, etc., and non-metallic, noxious substances such as chlorides, sulfates, fluorides, etc., are still present in vapor form in the exhaust gas following the first cooling; and in that these noxious substances are separated out of the cyclone exhaust gas following the second cooling step.

5. A method of thermic disposal of waste materials such as sewage sludge, special garbage and the like, according to the steps of claim 1, characterized in that an airstream or oxygen stream is utilized in the first cooling step following the cyclone, taking heat from the materials by indirect heat transfer; and the preheated airstream or oxygen stream is introduced into the cyclone.

6. A method of thermic disposal of waste materials such as sewage sludge, special garbage and the like, according to the steps of claim 1, wherein the temperatures in said cyclone are maintained above 1600° C.

7. A method of thermic disposal of waste materials such as sewage sludge, special garbage and the like, comprising the steps: drying and burning of the waste materials, characterized in that dried waste materials are burned in a cyclone at high temperatures with formation of a molten slag low in noxious substances and of a hot exhaust gas that contains valuable substances and/or noxious substances volatilized out of the waste materials; separating valuable substances from the exhaust gas by partial condensation following a first exhaust gas cooling and separating the noxious substances out at lower temperatures by partial condensation following a second further exhaust gas cooling and following the second cooling step conducting the cyclone exhaust gas through a bulk fill filter for superfine dedusting and superfine gas scrubbing for the purpose of separating dust residues and those noxious substances that have not condensed in the two cooling steps.

8. A method of thermic disposal of waste materials such as sewage sludge, special garbage and the like, comprising the steps:

predrying waste materials, passing the predried waste materials through a cyclone at temperatures in excess of 1500° C. forming molten slag low in noxious substances and hot gas containing valuable substances and noxious substances;

passing the exhaust gas from the cyclone through a first exhaust gas cooling process and separating valuable substances from the gas following the first exhaust gas cooling;

passing the exhaust gases through a second exhaust gas cooling and separating out noxious substances by partial condensation;

utilizing exhaust gas from the second cooling for said predrying of material;

further passing cyclone exhaust gas following the second cooling step through dedusting and superfine gas scrubbing processes separating dust residues and noxious substances not removed in the cooling steps.

9. A method of thermic disposal of waste materials such as sewage sludge, special garbage or the like, comprising the steps: drying and burning of the waste materials, characterized in that dried waste materials are burned in a cyclone at high temperatures with formation of a molten slag low in noxious substances and of a hot exhaust gas that contains valuable substances and/or noxious substances volatilized out of the waste materials; separating valuable substances from the exhaust gas by partial condensation following a first exhaust gas cooling and separating the noxious substances out at lower temperatures by partial condensation following at least one further exhaust gas cooling and adding dust at the first exhaust cooling for a starting process.

10. A mechanism for thermic disposal of waste materials such as sewage sludge, special garbage or the like, comprising in combination:

a high temperature cyclone maintained at a temperature above 1500° C. for burning dried waste materials;

means for delivering dried waste materials to said cyclone;

a first cooler connected to receive hot exhaust gas from the cyclone containing valuable substances and noxious substances and separating out valuable substances by partial condensation in the cooler; and a second cooler connected to receive exhaust gas from the first cooler and separating out noxious substances.

11. A mechanism for thermic disposal of waste materials such as sewage sludge, special garbage or the like, constructed in accordance with claim 10:

including a drier for supplying material to the cyclone and means conducting exhaust gases from the cyclone to the drier for drying and preheating waste materials before they are introduced into the cyclone.

12. A mechanism for thermic disposal of waste materials such as sewage sludge, special garbage or the like, constructed in accordance with claim 11.

including means for mixing exhaust gases from the drier with hot cyclone gases for the destruction of aromatic substances.

13. A mechanism for thermic disposal of waste materials such as sewage sludge, special garbage or the like, constructed in accordance with claim 10:

including means for separating valuable substances from the gas following the first cooler and means for separating out noxious substances following the second cooler.

14. A mechanism for thermic disposal of waste materials such as sewage sludge, special garbage or the like, constructed in accordance with claim 10:

including means for introducing air and oxygen into the cyclone.

15. A mechanism for thermic disposal of waste materials such as sewage sludge, special garbage or the like, constructed in accordance with claim 14:

including means for preheating said air and oxygen in the cyclone before introducing the air and oxygen therein.

16. A mechanism for thermic disposal of waste materials such as sewage sludge, special garbage of the like, comprising in combination:

a high temperature cyclone for burning dried waste materials;

means for delivering dried waste materials to said cyclone;

a first cooler connected to receive hot exhaust gas from the cyclone containing valuable substances and noxious substances and separating out valuable substances by partial condensation in the cooler;

a second cooler connected to receive exhaust gas from the first cooler and separating out noxious substances;

and a bulk fill filter for superfine dedusting and gas scrubbing receiving gas from the second cooler.

17. A mechanism for thermic disposal of waste materials such as sewage sludge, special garbage of the like, comprising in combination:

a high temperature cyclone for burning dried waste materials;

means for delivering dried waste materials to said cyclone;

a first cooler connected to receive hot exhaust gas from the cyclone containing valuable substances and noxious substances and separating out valuable substances by partial condensation in the cooler;

a second cooler connected to receive exhaust gas from the first cooler and separating out noxious substances;

and means for adding dust to said first cooler.

* * * * *